United States Patent [19]
Rey et al.

[11] Patent Number: 5,240,509
[45] Date of Patent: Aug. 31, 1993

[54] METHOD FOR REMOVING SOLIDS FROM SYSTEMS CONTAINING WATER-BASED PAINTS

[75] Inventors: Paul A. Rey, Coraopolis; Robert J. Guerrini, Aliquippa, both of Pa.

[73] Assignee: Calgon Corporation, Pittsburgh, Pa.

[21] Appl. No.: 913,552

[22] Filed: Jul. 14, 1992

Related U.S. Application Data

[63] Continuation of Ser. No. 705,867, May 28, 1991, abandoned.

[51] Int. Cl.$^5$ .......................... B08B 3/00; B08B 7/00; B01D 21/01; C02F 1/52
[52] U.S. Cl. ........................................ 134/38; 210/712; 210/930
[58] Field of Search .................... 134/38; 210/712, 930

[56] References Cited

U.S. PATENT DOCUMENTS

| | | | |
|---|---|---|---|
| 3,515,575 | 6/1970 | Arnold | 210/701 |
| 3,861,887 | 1/1975 | Forney | 55/19 |
| 3,990,986 | 11/1976 | Gabel et al. | 252/DIG. 8 |
| 4,002,490 | 1/1977 | Michalski et al. | 134/38 |
| 4,026,794 | 5/1977 | Mauceri | 210/43 |
| 4,130,674 | 12/1978 | Roberts et al. | 134/38 |
| 4,401,574 | 8/1983 | Farrington et al. | 210/728 |
| 4,440,647 | 4/1984 | Puchalski | 134/10 |
| 4,629,572 | 12/1986 | Leitz et al. | 210/714 |
| 4,637,824 | 1/1987 | Pominville | 134/38 |
| 4,656,059 | 4/1987 | Mizuno et al. | 210/729 |
| 4,759,855 | 7/1988 | Kaiser | 210/712 |
| 4,853,132 | 8/1989 | Merrell et al. | 210/712 |
| 4,880,471 | 11/1989 | Kaiser | 134/38 |
| 4,935,149 | 6/1990 | Morse | 210/712 |

FOREIGN PATENT DOCUMENTS 0293129 11/1988 European Pat. Off.

*Primary Examiner*—Theodore Morris
*Assistant Examiner*—Zeinab El-Arini
*Attorney, Agent, or Firm*—W. C. Mitchell; C. M. Caruso

[57] ABSTRACT

Methods of treating circulating water containing over-sprayed, water-borne paint, alone or in combination with over-sprayed solvent-borne paint, as in a paint spray booth operation, comprise maintaining the alkalinity of the paint spray booth water between about 50 and 2000 ppm, on a calcium carbonate basis, by adding an alkalinity source thereto, maintaining the pH between about 6.0 and 9.0, adding a melamine polymer to the water, adding an aluminum salt to the water, contacting the over-sprayed paints with the alkalinity-adjusted paint spray booth water before or after addition of the melamine polymer and aluminum salt, adding an effective amount of a flocculant to the paint spray booth water, and removing resulting sludge from the paint spray booth water.

15 Claims, 1 Drawing Sheet

Aluminum Salts added with 1000 ppm PK-9511

METHOD FOR REMOVING SOLIDS FROM SYSTEMS CONTAINING WATER-BASED PAINTS

This is a continuation of application Ser. No. 705,867, filed May 28, 1991, now abandoned.

BACKGROUND OF THE INVENTION

Automobile bodies and many industrial and consumer articles are conventionally spray painted in areas called spray booths, wherein water is employed to cleanse the air of over-sprayed paint. The wash water is then treated to remove paint solids, and the treated water is recirculated.

In one type of paint spray booth operation, a water curtain is created by pumping water into a trough above the overspray area. The overflow from the trough is then controlled so that a uniform sheet of water falls along the length of the trough and down the booth's wall. Water spray nozzles are also commonly used in lieu of an overflow curtain. Alternatively, down draft systems which utilize venturi scrubbers can be used.

In any case, fine droplets of oversprayed paint, emitted by a spray gun, contact and are captured by the recirculating water of a paint spray booth system.

The amount of paint contacting recirculating water may change depending on a number of variables, including plant or process shutdowns, the size and shape of the object being painted, the type of spray equipment used, the spraying and purge technique used, the water flow rate and the type of paint used.

In the past, solvent-based or solvent-borne paints have commonly been employed in spray booths. Federal regulations now limit the amount of volatile organic compounds (i.e., vocs) that can be released at a given plant site. Since organic solvent diluents used in solvent-based paint are a major source of vocs, water-borne or water-based paints are now being used in spray booth operations to help comply with these regulations. This means that the circulating water of spray booth operations may oftentimes contain both solvent-borne and water-borne paint.

The term "solvent-based paints", as used herein, refers to all varieties of water-insoluble coatings applied in spraying operations, including but not limited to oil base paints, enamels, urethanes and lacquers. These products, if untreated, readily adhere to the walls of spray booth systems and to any other surfaces that they contact, such as the surfaces of water distribution piping, spray nozzles, and the like. As used herein, the terms "solvent-based paints" and "solvent-borne paints" are synonymous.

The term "water-based paints", as used herein, refers to all varieties of coatings which contain in excess of approximately 10% water in the coating formulation, including, but not limited to, water-reducible alkyd and epoxy ester compositions, water-borne thermoplastic latex compositions using acrylic polymer/copolymers, water-based latexes of polyurethane dispersions, and blends of such compositions. As used herein, the terms "water-based paints" and "water-borne paints" are synonymous.

A primary treatment objective relative to solvent-based paints concerns the tacky or adhesive nature of the over-sprayed coating material. Due to their hydrophobicity, solvent-based solids tend to coalesce and accumulate on the walls, ceilings and floors of spray areas and to clog water spray equipment, recirculating pumps and the like. Thus, the over-sprayed paint mist captured in the water system of a spray booth must be detackified, or "killed," to prevent adherence to the walls, piping, etc. of the spray booth system. Paint that sticks to spray booth surfaces usually cannot be easily removed from the equipment and tends to build up over time, thereby hampering spray booth efficacy.

In contrast, the primary treatment objective relative to water-based paints is to capture and collect finely-dispersed paint solids. Water-based paints are not tacky in nature. However, without treatment, these paints tend to remain dispersed due to their compatibility with water. Ultimately, uncaptured solids accumulate in the system and settle in sludge recovery pits and in booth weirs. Such solids encourage the growth of anaerobic bacteria colonies which may result in odor problems. This treatment problem is aggravated by the use of water-based paints because such paints generally contain resins and dyes which are highly compatible with water.

As disclosed in copending application U.S. Ser. No. 588,997, these treatment objectives are generally diametrically opposed relative to alkalinity concentration. Thus, optimal detackification of solvent-based paints generally occurs in water systems having relatively high alkalinity while, on the other hand, improved collection of water-based paints generally occurs in water systems having relatively low alkalinity. Other problems which severely interfere with spray booth operations occur in areas of high agitation where foaming occurs and in areas where foam accumulates. Foaming is caused by chemical additives, surfactants, solvents or combinations thereof. Also, finely dispersed paint solids which are not captured and removed tend to stabilize foam, which aggravates foaming problems. Foaming generally mandates that copious amounts of defoamers be used, which results in higher operating costs. Water-based paints generally tend to cause foaming to a greater extent than solvent-based paints.

A wide variety of chemicals have been proposed as treating agents for circulating wet spray booth waters containing over-spray paint, including compositions containing polymers and amphoteric metal salts which form insoluble hydroxides at pH's greater than about 7. The use of combinations of this type are described in the following U.S. Pat. Nos. 3,861,887 to Forney; 3,990,986 to Gabel et al; 4,002,490 to Michalski et al; 4,130,674 to Roberts et al; and 4,440,647 to Puchalski. Further, U.S. Pat. No. 4,637,824 to Pominville discloses the use of silicates and polydiallyldialkylammonium halides with amphoteric metal salts, and U.S. Pat. No. 4,853,132 to Merrell et al discloses the use of precipitates formed by the reaction of cationic polymers and salts of inorganic anions to detackify solvent-based paints. Bentonite clays, aluminum salts and zinc salts have also been used with cationic polymers.

U.S. Pat. No. 4,656,059 to Mizuno et al relates to the use of melamine-aldehyde acid colloid solutions for treating paint in wet spray booths, and U.S. Pat. No. 4,629,572 to Leitz et al relates to the use of urea or amino triazine-aldehyde condensation reaction products in combination with water-swellable clays to treat paint spray booth wastes. Further, U.S. Pat. No. 4,935,149 discloses the use of formaldehyde-scavenged melamine-formaldehyde polymers to treat paint spray booth waters.

Additionally, copending and commonly assigned U.S. patent application Ser. No. 433,469, filed Nov. 9, 1989 by Charles A. Faust and Joseph P. Miknevich, discloses a method employing melamine-formaldehyde-type polymers in conjunction with alkalinity sources and flocculant polymers to detackify solvent-based coatings captured in paint spray booth systems. The Rey copending and commonly assigned U.S. patent application Ser. Nos. 475,670, filed Feb. 9, 1990, and U.S. Pat. No. 588,997, filed Sep. 9, 1990, disclose additional methods for removing solids from water-based paint systems and combination water/solvent-based paint systems using melamine-formaldehyde polymers. The Morse copending and commonly assigned U.S. patent application Ser. Nos. 296,258, filed Jan. 12, 1989 and 501,466 filed Mar. 30, 1990 disclose further methods for detackification of paint spray systems using melamine-formaldehyde polymers.

U.S. Pat. No. 4,401,574 to Farrington et al discloses the use of polyaluminum chloride to flocculate and settle dispersed paint solids resulting from the production of latex paints and U.S. Pat. No. 4,026,794 to Mauceri discloses water soluble salts of amphoteric metals in combination with dimethyl diallyl ammonium polymers to break oil-in-water emulsions. JP52071538 discloses the use of coagulants such as aluminum sulphate, aluminum polychloride and calcium hydroxide in combination with polymer accelerators to aggregate coating particles in coating booth waste water steams. U.S. Pat. Nos. 4,759,855 and 4,880,471 disclose the use of alkaline zinc solutions containing ammonium hydroxide and ammonium chloride to treat over-sprayed paint.

The instant invention is distinguishable over the above references and copending applications in that the instant invention is specifically directed to particular aluminum salt/melamine polymer/flocculant-based systems which can be used with improved results to treat circulating paint spray booth waters containing over-sprayed water-based paints, alone or in combination with solvent-based paints. Thus, melamine-formaldehyde-polymers, in conjunction with specific aluminum salts and various polymeric flocculants, applied within designated operating parameters, provide improved treatment of water-based paint or combination water-/solvent-based paint over-spray systems.

SUMMARY OF THE INVENTION

Figure 1:
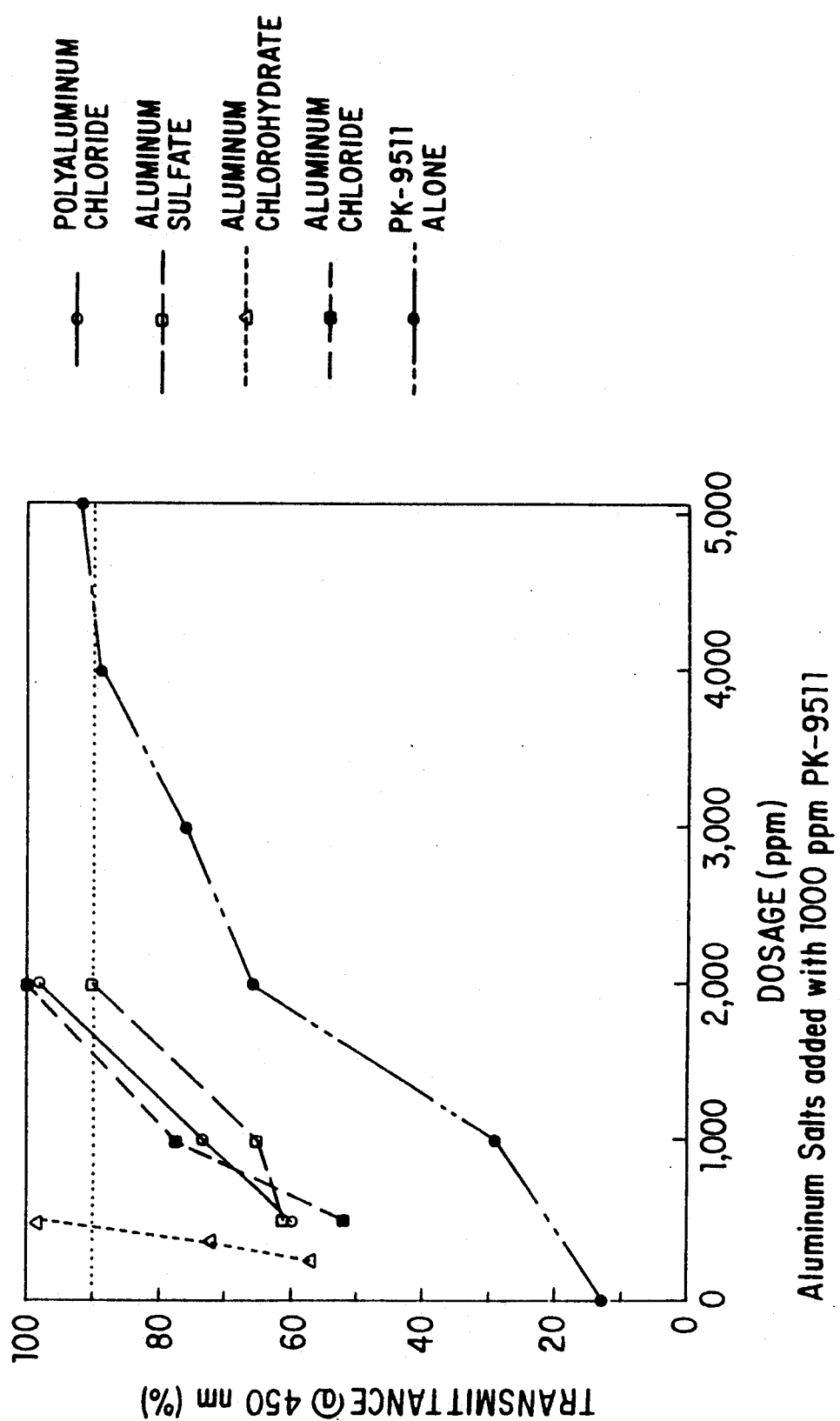
FIG. 1 shows the relationship between the dosage of various aluminum salts and water clarity, as measured by transmittance, in the presence of 1000 ppm of a melamine-aldehyde acid colloid.

The instant inventors have discovered that melamine polymers, in conjunction with specified aluminum salts and polymeric flocculants, applied within designated pH alkalinity ranges, can be used with improved results to treat water which contains water-based overspray paint, alone or in combination with solvent-based paints. Such water, after treatment and collection of the over-sprayed paints contained therein, is typically recirculated in paint spray booth operations. Order-of-addition and point-of-addition have also been discovered to be important relative to optimal treatment.

Further, the present inventors have discovered an improved melamine polymer/aluminum-based method of treatment which substantially improves suspended solids removal and which extends the range of water chemistry in which over-sprayed water-borne paints, alone or in combination with solvent-borne paints, can be treated.

More particularly, the present invention relates to methods of treating circulating paint spray booth water containing over-sprayed, water-borne paint, alone or in combination with solvent-borne paint, to facilitate removal of over-sprayed paint(s) from such water. The essence of the invention lies in the use of aluminum salts in conjunction with a melamine polymer, preferably prepared by reacting melamine or a substituted melamine and an aldehyde, alone or in combination with other monomers, more preferably a polymer prepared using melamine and formaldehyde in acid colloid form, to treat water-based oversprayed paint, alone or in combination with solvent-based paint. Such polymers are also referred to as melamine aldehyde-type polymers.

A number of automotive manufacturers use a three coat system (e.g., primer/basecoat/clearcoat) for painting automobiles and trucks. Generally, the primer and clearcoat are solvent-borne paints, while water-borne paints are rapidly finding acceptance for use as basecoats in automotive and fascia manufacture. This is due in part to government regulations controlling volatile organic carbon emissions from paint spray operations. While combined water systems for treating and collecting over-sprayed water-based and solvent-based paints offer significant advantages in terms of capital equipment expenditure and ease of operation, water-based and solvent-based paints are generally characterized by diverse behavior in water in the presence of alkalinity.

As disclosed in copending U.S. patent application Ser. No. 588,997, the treatment of solvent-borne and water-borne paints is significantly affected by alkalinity. Since low alkalinity favors water-based paints (i.e., less than about 300 ppm as $CaCO_3$) while solvent-borne paints are best treated at relatively high alkalinity levels (i.e., greater than 400 ppm as $CaCO_3$), the treatment of both water-borne and solvent-borne paints in the same system appears to be contradictory, based on how the respective paints react to alkalinity.

In the low alkalinity region, solvent-borne paints are not adequately detackified. High alkalinity generally causes water-borne paints to over-disperse, thereby significantly reducing effectiveness. However, operation within a range of intermediate alkalinity provides effective treatment for a combination of water-borne and solvent-borne paints, as disclosed in U.S. patent application Ser. No. 588,997. The addition of aluminum salts, as described herein, tends to extend the alkalinity range in which both water and solvent-based paints can be effectively handled. This method is therefore more versatile in dealing with pH and alkalinity fluctuations common in operating systems.

The present invention is directed to an efficient system for treating circulating water used to capture a wide variety of water-based paints, alone or in combination with solvent-based paints. The present invention, which requires the use of aluminum salts, generally produces a low-volume, flocculated, predominantly organic sludge which may be readily disposed of in land fills or by incineration. Further, this invention generally reduces chemical consumption, particularly melamine polymer consumption, improves suspended solids removal and extends the alkalinity range available to treat water-borne paints, alone or in combination with solvent-borne paints.

DETAILED DESCRIPTION OF THE INVENTION

The present invention relates to a method for treating circulating paint spray booth water which contains or which will contain over-sprayed water-based paint(s), alone or in combination with solvent based paints, to facilitate the removal of the over-sprayed paint(s) from the water being treated, i.e., the water of a spray booth system or operation. More particularly, present invention is a method for treating the circulating water of a paint spray booth system used to capture over-sprayed, water-borne paint, alone or in combination with over-sprayed solvent-borne paint, which method comprises: a) maintaining the alkalinity of said circulating water in the aqueous system being treated, namely circulating paint spray booth water, within the range of 50–2000 ppm, on a calcium carbonate basis, preferably between 100 to 1000 ppm as $CaCO_3$, by adding a source of alkalinity to said circulating water while maintaining the pH of said circulating water between about 6.0 and about 9.0, preferably about 6.5 to about 8.0; b) adding to said water an effective amount of a melamine polymer; c) adding to said circulating water an effective amount of an aluminum salt; d) contacting said over-sprayed water-borne paint with said circulating water after completing step a), i.e., contacting said paint with the alkalinity-maintained circulating water of step a); e) adding an effective amount of a flocculant to said circulating water after completing steps (a), (b), (c) and (d) i.e., after said over-sprayed water-borne paint contacts the alkalinity, melamine polymer and aluminum salt; and f) removing resulting sludge from said circulating water being treated.

The water-borne paint can contact the circulating, pH and alkalinity-maintained water before or after addition of the melamine polymer and/or the aluminum salt. If a solvent-borne paint is also present, however, an effective portion of the melamine polymer must be added to the circulating water prior to addition of the paint, so that it is present to detackify the solvent-borne paint. As used herein, the term "effective portion" refers to that portion of the total amount of the melamine polymer added necessary to treat the solvent-borne paint in a given system.

The present invention is also directed to a method for treating the circulating water of a paint spray booth system used to capture over-sprayed water-borne paint and over-sprayed solvent-borne paint, wherein all or an effective portion of a melamine polymer is added prior to contact between the over-sprayed solvent-borne paint with the pH and alkalinity-maintained water, as described above.

Before the over-sprayed, water-based paint, alone or in combination with at least one solvent-based paint, contacts paint spray booth water, the alkalinity of the water in the paint spray booth system being treated should be adjusted to maintain a minimum alkalinity of about 50 ppm (as $CaCO_3$) to a maximum alkalinity of about 2000 ppm. Preferably, the alkalinity should be maintained between about 100 and about 1000 ppm (as $CaCO_3$). These alkalinity ranges are generally critical, particularly if solvent-borne paints are present. At higher alkalinity dosages, paint solids become increasingly difficult to capture, which decreases separation efficiency. At even higher dosages, the paint solids tend to sink instead of float. If sufficient alkalinity is not present (i.e., below about 50 ppm), the treatment is not as effective, resulting in very poor collection efficiency and poor detackification of the solvent-based paint.

Additionally, the pH of the water being treated should be maintained between about 6.0 and about 9.0, preferably between about 6.5 and 8.0. It is believed that the type of acid or base used to adjust and maintain pH is not critical and that any acid or base can therefore be used. Acids and bases such as sulfuric acid and caustic, respectively, are generally used to adjust pH, if pH adjustment is necessary. A pH of at least about 6.0 is desirable in order to activate the melamine polymer. As the pH is lowered below about 6.0, corrosion in the system generally increases. On the other hand, a pH of greater than about 9.0 generally results in greater solids dispersion, thus creating less efficient solids capture, and causes greater foam generation.

Any alkalinity source can be used. For example, alkalinity can be added in the form of alkali metal carbonates or alkali metal bicarbonates such as sodium carbonate or sodium bicarbonate, or as NaOH, KOH, silicates and/or blends thereof. The, preferred alkalinity sources are sodium carbonate or sodium bicarbonate. These alkalinity sources are generally inexpensive and safe to use, and they provide excellent flotation of water-based paint solids when used in combination with polymeric flocculants.

The alkalinity should be maintained so that the circulating water which contacts the over-sprayed paint or paints being treated is in the designated alkalinity range. Any method of adding the source of alkalinity can be used, including batch or continuous addition, though continuous addition is preferred.

In addition to the alkalinity requirement, an effective amount of a melamine polymer must be used.

As used herein, the term "melamine polymer" refers to polymers prepared from (a) melamine or a substituted melamine; and (b) at least one compound described by the following formula:

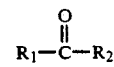

wherein $R_1$ and $R_2$, which may be the same or different, are selected from the group consisting of H and straight or branched $C_{1-4}$ alkyl groups. The preferred compounds of (b) comprise aldehydes, with methanol (formaldehyde), ethanol and propanol being especially preferred; the most preferred aldehyde is formaldehyde. Such polymers may also include additional mer units. Nothing herein should be construed as limiting the term "melamine polymer" to polymers which contain only (a) and (b). For example, other known amino-containing monomer units, such as urea, may be present. The melamine polymers of the instant invention may be prepared by reacting the desired monomers according to standard condensation polymerization procedures. See, for example, U.S. Pat. No. 4,656,059. In general, such polymers are melamine/ aldehyde condensates, wherein the melamine mer units may be replaced by other $NH_2$-reactive monomers, but wherein melamine is the dominant $NH_2$ source in the condensation reaction.

The mole ratio of component (a) to component (b) should generally range from about 1:1 to about 1:6, with the preferred ratio being from about 1:1 to about 1:3. The most preferred mole ratio is about 1 mole of melamine or a substituted melamine to about 2 to 2.5 moles of an aldehyde. Thus, the most preferred polymer is prepared by reacting melamine and formaldehyde with the mole ratio of melamine to formaldehyde being about 1:2 to about 1:2.5. Other compounds may also be reacted with the melamine and formaldehyde components to yield melamine polymers or melamine-aldehyde-type polymers which are, for example, terpolymers. Compounds containing $NH_2$ groups are preferred comonomers.

The instant melamine polymers are insoluble in water. They are therefore best utilized in acidic solutions wherein the melamine polymer is stabilized in a fine colloidal state of suspension. Calgon's product CA 289, which has a pH of about 1.6 to about 2.1, is an example of the preferred form. This product contains 8 active melamine-formaldehyde polymer in an acidic aqueous solution. Any acid can be used to prepare the melamine aldehyde acid suspension, although hydrochloric acid is preferred. Also, other stabilizing agents, such as alcohols, can be used.

The percent, by weight, of active melamine polymer in a stabilized (acidic) suspension or solution should range from about 0.1% to about 20%, preferably 1% to about 15%, and most preferably about 4% to about 12%, due to cost and product stability considerations. The pH should be sufficiently low to keep the melamine formaldehyde-type polymer in a fine colloidal suspension.

The molecular weight of the melamine formaldehyde-type polymer is not critical. However, the preferred molecular weight generally ranges from about 500 to about 50,000, and the most preferred molecular weight ranges from about 500 to about 5,000. As noted above, suitable melamine formaldehyde-type polymers are commercially available from Calgon Corporation, under the tradenames CA-289, WR-2511 and PK-9511. These products have molecular weights of about 2,200.

An effective amount of the melamine polymer should be added to or maintained in the water being treated in conjunction with an effective amount of aluminum salt. While any aluminum salt can be used, the preferred aluminum salts contain a chloride anion. Thus, examples of the preferred aluminum salts include, aluminum chlorohydrate, polyaluminum chloride (PAC), which is also called basic aluminum chloride and which is represented by the empirical formula $Al_n(OH)_m Cl_{3n-m}$ ($n \geq 1.0$ and m:n ratio = 0 to 2.5), aluminum chloride and blends thereof.

As used herein, the term "effective amount" refers to that amount of melamine polymer and aluminum salt which achieves the desired water clarity and paint solids capture after addition of flocculant to the system being treated, and the desired detackification of solvent-borne paint, if present. Generally, the weight ratio of the melamine-formaldehyde polymer and the aluminum salt should range from about 50:1 to about 1:50, on an active weight basis.

The melamine polymer and aluminum salt can be applied intermittently or continuously to the water system being treated at a preferred dosage of from between about 0.001 to about 1.0 part melamine polymer (active basis) per part paint, most preferably between about 0.01 and about 0.5 part active melamine polymer per part paint. Since spraying is generally continuous, continuous addition of the melamine polymer and aluminum salt is preferred. In the case of water-borne paints, the melamine polymer and aluminum salt may be added at any convenient location, but are preferably added so as to allow the maximum concentration of the melamine polymer and the aluminum salt to contact the over-sprayed paints. For combined water and solvent-borne systems, it is essential to add at least enough of the melamine polymer for detackification purposes to the circulating water prior to the point where the solvent-borne paint contacts the water. For example, some of the melamine polymer may be added to a line supplying the trough or other device used to form the water curtain.

Multiple points of addition are acceptable and may be preferred in some systems. For example, the melamine-aldehyde polymer and/or the aluminum salt feed may be split so as to add at least some of the melamine polymer and/or the aluminum salt before and after the circulating water contacts water-borne paint. While the alkalinity adjustment, the melamine polymer and the aluminum salt addition steps may be carried out simultaneously, it is noteworthy that alkalinity adjustment must occur prior to contact between over-sprayed paint and the circulating paint spray booth water. Thus, a key factor is that the over-sprayed paint contact water within the desired alkalinity range, irrespective of when the melamine polymer and/or aluminum salt are added.

In a typical paint spray booth operation, the return water from the booth generally encounters extreme turbulence. This turbulence improves the efficacy of the treatment by promoting intimate contact between the paint and the melamine polymer.

After over-sprayed, water-based paint, alone or in combination with solvent-based paint, contacts alkalinity, the melamine polymer and the aluminum salt in the circulating water, an effective amount of a polymeric flocculant is added to the paint spray booth water system. Relative to the flocculant, the term "effective amount" refers to that amount of flocculant necessary to promote the formation of a buoyant floc structure by binding the conditioned paint particles and incorporating air into the floc structure. The resulting floating floc facilitates the removal of paint solids from the circulating water system. The paint sludge generated from co-addition of a melamine formaldehyde and an aluminum salt has desirable handling and dewatering properties.

The type of polymeric flocculant used and its molecular weight are not believed to be critical. Suitable flocculants include nonionic polymers, anionic polymers, amphoteric polymers, or mixtures thereof.

Nonionic or slightly anionic (i.e., <10% charge) polymeric flocculants are acceptable. Generally, such flocculants having weight average molecular weights of at least $2 \times 10^6$ are preferred. More preferably, the molecular weight should exceed about $6 \times 10^6$.

Examples of acceptable flocculants include long chain polyacrylamides and long chain polymethacrylamides; the preferred flocculants are nonionic or slightly anionic polyacrylamides having a weight average molecular weight ranging from about $6 \times 10^6$ to about $20 \times 10^6$.

Typical cationic polyelectrolytes which may be used as flocculants in the instant invention include but are not limited to polyamines, polyphosphonium compounds, polysulfonium compounds, quaternary ammonium compounds, polymers of methacryloyloxethyl trimethyl ammonium methyl sulfate (METAMS), polymers of methacrylamido propyl trimethyl ammonium chloride (MAPTAC), polymers of acryloyloxyethyl trimethyl ammonium chloride (AETAC), polymers of methacryloyloxyethyl trimethyl ammonium chloride (METAC) and polymers prepared from combinations of METAMS, MAPTAC, AETAC and/or METAC with acrylamide and/or methyacrylamide. Representative of quaternary ammonium compounds are diethyl diallyl ammonium and dimethyl diallyl ammonium polymers and salts thereof.

The preferred cationic flocculants are quaternary ammonium polymers such as polydimethyl diallyl ammonium chloride (polyDMDAAC), poly dimethyl diallyl ammonium bromide (polyDMDAAB), poly diethyl diallyl ammonium chloride (polyDEDAAB), or any of the same copolymerized with acrylamide or methacrylamide. The preferred molecular weights for the quaternary ammonium polymers are in excess of about 2,000,000.

The most preferred cationic flocculant is a polymer comprising dimethyl diallyl ammonium chloride and acrylamide, or a homologue thereof, having a weight average molecular weight in excess of about 4,000,000. The ratio of the nonionic moiety (for example, acrylamide or methacrylamide) to the cationic moiety should be greater than about 1:1, on an active weight basis.

Other preferred polymers comprise: a) acrylamide or methacrylamide and b) METAMS, METAC, MAPTAC or AETAC, wherein the monomer ratio of a):b), on an active weight basis, is greater than about 1:1.

The preferred anionic polyelectrolytes possess a low charge (i.e., less than 10%) and are selected from the group consisting of polyacrylic acids and salts thereof, particularly sodium salts thereof, having a molecular weight ranging from about $2 \times 10^6$ to about $20 \times 10^6$, hydrolyzed polyacrylamides having virtually any degree of hydrolysis and molecular weights ranging from about $2 \times 10^6$ to about $20 \times 10^6$, and polymers comprising a) acrylic acid or methacrylic acid and b) 2-acrylamido-2-methylpropylsulfonic acid and/or 2-methacrylamido-2-methylpropylsulfonic acid, wherein the weight ratio of a):b) ranges from about 1:99 to about 99:1, preferably 10:90 to 90:10 and most preferably 75:25, and wherein the molecular weight ranges from about $2 \times 10^6$ to about $20 \times 10^6$ High molecular weight polyampholytes can be used in the instant method. Representative examples of suitable polyampholytes include polymers comprising a) acrylic acid, methacrylic acid, 2-acrylamido-2-methylpropylsulfonic acid or 2-methacrylamido-2-methylpropylsulfonic acid, alone or in combination, and b) dimethyl diallyl ammonium chloride, dimethyl diallyl ammonium bromide, diethyl diallyl ammonium chloride or diethyl diallyl ammonium bromide, alone or in combination, wherein the weight ratio of component a) to component b) ranges from about 90:10 to about 10:90 and wherein the polyampholyte has a molecular weight in excess of about $2 \times 10^6$ The polyampholytes may also contain nonionic moieties such as acrylamide or methacrylamide.

Blends of the above listed nonionic, cationic, anionic and polyampholyte flocculants can be used, alone or in combination with amphoteric metal salts.

An effective amount of the polymeric flocculant should be added. The effective amount for a given system generally depends upon the quantity of melamine aldehyde-type-polymer present in the system being treated. Preferably, the effective flocculant dosage will range from about 0.01 to about 150 parts (active basis) of the polymeric flocculant per part melamine aldehyde-type polymer (active basis); more preferably, 0.1 to 20 parts, on an active polymer: active polymer basis.

The function of the polymeric flocculant is two-fold: it reacts with the melamine polymer and aluminum-treated paint solids to form a large, buoyant, easily-captured floc, and it reduces or totally eliminates foam formation in the system by removing colloidal particulates present in the water.

After contacting the melamine polymer and aluminum-treated paint solids with at least one polymeric flocculant, the sludge is removed from the water. This removal may be facilitated by any means known in the art, including but not limited to air flotation and filtration.

The inventors have found that the point of addition of the flocculant is generally critical. The polymeric flocculant must be added after the melamine polymer, aluminum salt and alkalinity have contacted and conditioned the oversprayed paint, and preferably immediately prior to the point in the system where the treated water-based paint is collected. Alternatively, a portion of the flocculant may be added at the inlet to a pit, sump or other device used to concentrate the paint solids into a small portion of the water in the system (for example an overflow weir going to a collection device), with the balance added immediately prior to the point of collection. This will have the additional benefit of minimizing foaming in the overall system by removing the fine particulates that stabilize foam formation.

Other additives commonly used for paint "killing" may be used in the instant method. For example, bentonite clays, carbon black, talc, gums, starch, dextrin, lime, aluminum oxide, silica solids, and casein among other additives, may be used as additional process aids in conjunction with the primary steps of the instant method. Additives from the class of amphoteric metal salts, including but not limited to ferric sulfate and ferric chloride, can also be used to enhance the performance of the instant invention.

EXAMPLES

The following examples are intended to further demonstrate the instant invention. They are not, however, intended to in any way limit the instant invention.

EXAMPLE 1

In this example, the following procedure was used for each run represented in FIG. 1.

1. 200 mls of tap water was added to a 400 ml wide mouth jar; and the pH of the water was adjusted using calcium carbonate so that the pH after chemical addition was between about 7.5 and 8.0.
2. The water was mixed, using a Fisher Science Thermix Magnetic Stirrer Model 120M (setting 9 was used).
3. PK-9511 (an 8% melamine-aldehyde acid colloid solution commercially available from Calgon Corporation) was added.
4. The designated aluminum salt was added, except in the control run.
5. 0.2 grams of a mixture of water-borne paints was added.
6. The system was mixed for 45 seconds.
7. 10 ppm, on an active basis, of a commercially available nonionic polyacrylamide having a molecular weight of 10–15 was added.
8. The system was mixed for 30 seconds.
9. The stirrer was turned off.
10. The system was allowed to stand for 2 minutes.

11. The water clarity was measured as % transmittance using a Bausch and Lomb Spectronic mini 20 spectrophotometer @ 450 nm.

The results are shown in FIG. 1. FIG. 1 shows the effectiveness of various aluminum salts in combination with a melamine-aldehyde acid colloid in removing suspended paint solids vs. the melamine formaldehyde polymers alone. Table I below shows the aluminum salt:melamine formaldehyde replacement ratios obtained, i.e., the amount of melamine polymer which can replace 1 part of aluminum salt to obtain 90% transmittance.

TABLE I

| Product | Replacement ratio alum salt: PK-9511 |
|---|---|
| PK-9511 | 1:1.0 |
| POLY Aluminum Chloride | 1:2.0 |
| Aluminum | 1:1.7 |
| Aluminum Chlorohydrate | 1:7.3 |
| Aluminum Chloride | 1:2.2 |

EXAMPLES 2-9

A mixture of BASF water-borne paints was added to a 30 gallon pilot spray booth unit at 25 ml/min. Immediately thereafter, PK-9511 and an aluminum salt were fed continuously. The flocculant of Example 1 was then added after contact between the paint and the melamine polymer and aluminum salt. The alkalinity was maintained (with sodium bicarbonate) at 250 ppm, as $CaCO_3$. This procedure was repeated for each test. The test conditions are summarized in Table II, below, and the results are shown in Table III. The rise rate of the flocculant paint solids, the water clarity @ 450 nm and the suspended solids of the system water were measured after 4½ hours of operation. The rate of accumulation of the dissolved inorganic materials in the water was also measured. The lower the rate the better the treatment. The pH of the system was adjusted using NaOH.

TABLE II

| | | | Test Conditions | | | |
|---|---|---|---|---|---|---|
| | Paint | PK-9511 | Aluminum Salt | | | Alkalinity |
| Example | (ml/min) | (ml/min) | Type | (ml/min) | pH | (ppm) "as $CaCO_3$" |
| 2 | 25 | 10 | PAC (≈30% active) | 6.8 | 7.0 | 250 |
| 3 | 25 | 10 | PAC (≈30% active) | 6.8 | 8.0 | 250 |
| 4 | 25 | 10 | Alum (≈50% active) | 9.0 | 7.0 | 250 |
| 5 | 25 | 10 | Alum (≈50% active) | 8.7 | 8.0 | 250 |
| 6 | 25 | 19 | Al Chlorohydrate (≈50% active) | 3.0 | 7.0 | 250 |
| 7 | 25 | 10 | Al Chlorohydrate (≈50% active) | 3.0 | 8.0 | 250 |
| 8 | 25 | 10 | Al Chloride (≈30% active) | 6.8 | 7.0 | 250 |
| 9 | 25 | 10 | Al Chloride (≈30% active) | 6.8 | 8.0 | 250 |

TABLE III

| Example | Floc Rise Rate (cm/sec) | Water Transmittance @ 450 nm (%) | Suspended Solids (ppm) | Accumulations of Dissolved Solids (μmhos/hr) |
|---|---|---|---|---|
| 2 | 2.2 | 98 | 42 | 1390 |
| 3 | 2.2 | 90 | 42 | 1750 |
| 4 | 1.5 | 23 | 300 | 1670 |
| 5 | 1.5 | 51 | 216 | 2440 |
| 6 | 2.2 | 98 | 170 | 580 |
| 7 | NA | 89 | NA | 782 |
| 8 | 3.0 | 98 | 78 | 2560 |
| 9 | 3.0 | 98 | 120 | 3571 |

NA - not available

What is claimed is:

1. An improved method for treating the circulating water of a paint spray booth system used to capture over-sprayed water-borne paint, and for achieving a desired water clarity in said circulating water, which method comprises:
   (a) maintaining the alkalinity of said circulating water between about 50 and 2000 ppm, on a calcium carbonate basis, by adding a source of alkalinity to said water while maintaining the pH of said circulating water between about 6.0 and about 9.0;
   (b) adding to said water an effective amount, for the purpose of achieving said desired water clarity, of a melamine polymer;
   (c) adding to said circulating water an effective amount, for the purpose of achieving said desired water clarity, of an aluminum salt;
   (d) contacting said over-sprayed water-borne paint with said circulating water after completing step (a) above;
   (e) adding about 0.1 to about 150 parts, on an active basis, of a flocculant to said circulating water per part melamine polymer, on an active basis, after completing steps (a), (b), (c), and (d); and
   (f) removing resulting sludge from said circulating water.

2. The method of claim 1, wherein the alkalinity of said circulating water is maintained between about 100 and 1000 ppm.

3. The method of claim 1, wherein the pH of said water is maintained in the range of about 7.0 to about 8.5.

4. The method of claim 1, wherein the alkalinity source is selected from the group consisting of bicarbonates, carbonates, hydroxides or silicates.

5. The method of claim 4, wherein the alkalinity source is selected from sodium carbonate, sodium bicarbonate and mixtures thereof.

6. The method of claim 1, wherein said melamine polymer is a melamine formaldehyde acid colloid.

7. The method of claim 1, wherein said flocculant is a nonionic polymer.

8. The method of claim 7, wherein said flocculant is a nonionic long chain polyacrylamide or nonionic long chain polymethacrylamide.

9. The method of claim 8, wherein said flocculant has a weight average molecular weight in the range of about $6 \times 10^6$ to about $2 \times 10^6$.

10. The method of claim 1, wherein a solvent-borne paint is present and wherein said melamine polymer is added to said water before the over-sprayed, water-borne and solvent-borne paints are contacted with said circulating water.

11. The method of claim 1, wherein feed of said melamine polymer is split so as to add a portion of said melamine polymer to said water before the over-sprayed, water-borne and solvent-borne paints are contacted with said circulating water.

12. The method of claim 1, wherein said aluminum salt contains a chloride ion.

13. The method of claim 12, wherein said aluminum salt is selected from the group consisting of aluminum chlorohydrate, polyaluminum chlorides, aluminum chloride and blends thereof.

14. In a method for treating the circulating water of a paint spray booth system used to capture oversprayed water-borne paint which involves the addition of an alkalinity source, a melamine polymer and a flocculant to said circulating water, the improvement which comprises adding an effective amount of an aluminum salt which contains a chloride ion to said circulating water for the purpose of achieving the desired water clarity.

15. The method of claim 14, wherein said aluminum salt is selected from the group consisting of aluminum chlorohydrate, polyaluminum chlorides, aluminum chloride and blends thereof.

* * * * *